(12) United States Patent
Kanarellis et al.

(10) Patent No.: US 10,749,375 B2
(45) Date of Patent: Aug. 18, 2020

(54) SYSTEM AND METHOD FOR SUPPLYING UNINTERRUPTIBLE POWER TO A POE DEVICE FOR A POWER SUPPLY INPUT FOR DIRECT CURRENT POWER

(71) Applicant: BTU RESEARCH LLC, Houston, TX (US)

(72) Inventors: Michael Kanarellis, Houston, TX (US); Charles I. McAndrew, Magnolia, TX (US)

(73) Assignee: BTU RESEARCH LLC, Houston (*) Notice: Subject to any disclaimer, the term of this patent is extended or adjusted under 35 U.S.C. 154(b) by 153 days.

(21) Appl. No.: 16/130,909

(22) Filed: Sep. 13, 2018

(65) Prior Publication Data

US 2019/0013696 A1 Jan. 10, 2019

Related U.S. Application Data

(63) Continuation-in-part of application No. 15/676,997, filed on Aug. 14, 2017, now Pat. No. 10,218,216, and a continuation-in-part of application No. 15/645,847, filed on Jul. 10, 2017, now Pat. No. 10,218,215, and a continuation-in-part of application No. 15/201,474, filed on Jul. 3, 2016, now Pat. No. 9,735,618.

(51) Int. Cl.
*H02J 9/06* (2006.01)
*H04L 12/10* (2006.01)
*H02J 13/00* (2006.01)
*H02J 7/00* (2006.01)

(52) U.S. Cl.
CPC ............. *H02J 9/061* (2013.01); *H02J 7/007* (2013.01); *H02J 13/0062* (2013.01); *H04L 12/10* (2013.01)

(58) Field of Classification Search
CPC ...................................................... H02J 9/061
See application file for complete search history.

(56) References Cited

U.S. PATENT DOCUMENTS

2015/0312048 A1* 10/2015 Bodo .................. H04L 43/0817
713/300

* cited by examiner

*Primary Examiner* — Daniel J Cavallari
(74) *Attorney, Agent, or Firm* — Craft Chu PLLC; Andrew W. Chu (57) ABSTRACT

A system and method for supplying uninterruptible power includes a housing, a power supply input for a DC power source, a power source equipment input, a powered device output, an alternative power supply, a control module, and a power source equipment extension. The control module includes a comparator, a switch, a line filter and protector and an injector. The injector includes a regulator and PoE power management module. The alternative power supply includes a plurality of battery packs in series. The system can be located at a remote location with only DC power sources, such as generators, batteries, and solar cells.

9 Claims, 3 Drawing Sheets

SYSTEM AND METHOD FOR SUPPLYING UNINTERRUPTIBLE POWER TO A POE DEVICE FOR A POWER SUPPLY INPUT FOR DIRECT CURRENT POWER

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to system and method for supplying uninterruptible power to a Power-over-Ethernet (PoE) device. More particularly, the present invention relates to a system with an active injector connected to a direct current or DC power supply input, an alternative power supply, and a power source equipment input as the PoE power.

2. Description of Related Art Including Information Disclosed Under 37 CFR 1.97 and 37 CFR 1.98.

A "Power over Ethernet" device is a powered device that works on electrical power supplied by an Ethernet cable. Power over Ethernet ("PoE") describes a technique to deliver electrical power via Ethernet cabling. A single cable transmits data and electrical power to devices, such as IP security cameras, network webcams, wireless access points, VoIP phones, network routers and others. There is no need for a separate power source for the PoE device. IEEE PoE standards set signaling standards for power source equipment, the actual power source, and the powered device, so that the powered devices and power source equipment can communicate. The power source equipment and powered device detect each other and regulate the amount of power supplied to the PoE device. By IEEE PoE standards, there is only a limited power transmission available through an Ethernet cable.

An uninterruptible power supply "("UPS"), or uninterruptible power source, provides emergency power to a powered device when the main power source is disrupted. The UPS is an immediate and generally instantaneous alternative power supply available as soon as the main power source fails. In contrast, a standby or emergency system is a separate power source, which must be activated and then switched over to supply the powered device. The immediacy and lack of delay are important for sensitive electronic equipment and continuous data processing.

The UPS protects powered devices from loss of data, loss of status information related to the powered device, and the subsequent costs associated with repair and resetting of the powered device. Those extra costs avoided can include delays in data processing, sending technicians off site to the location of the powered device, and loss of revenue from downtime of the system. UPS also prevents disruption of the software of a powered device. An unexpected loss of power may necessitate a re-boot or restart of the system, causing more delay and downtime beyond the downtime caused by the disruption of power.

In the prior art, the UPS has been an alternate power switch, activated as soon as a power disruption is detected. A switch changes the regular power supply to an alternative power source, such as a battery. Critical devices, such as heart monitors and breathing machines in a hospital room, may cease to function with an unexpected loss of power. The UPS intervenes during these moments to eliminate all the associated equipment and network downtime.

Various patents and publications are available in the field of uninterruptible power supplies. United States Patent Application No. 2012/0080944, published by Recker, et al. on Apr. 5, 2012, discloses a method and system that, in relevant part, keep a lighting grid functional in the absence of power. An intelligent control device, a wall switch, for instance, and a lighting grid must be wired to communicate with each other and have individual battery backups. When the intelligent control device identifies a power outage, it communicates to those devices with their own backups on the grid to adjust to motion and environment, as well as to change intensity and color.

For PoE devices, the incorporation of a UPS is complicated because of coordination between the power supply and the powered device. The PoE device is typically far removed from the actual power supply, such as an AC power outlet. In even more remote locations, there is no AC power outlet, and the main power supply may be a DC power source, such as a battery, generator, or even a solar powered cell. A disruption in the DC power source at the even more remote location still affects the PoE device. The UPS for the power source equipment is the prior art system of another battery or alternate power supply with an instantaneous switch. There is no UPS for a PoE device because the PoE device has no power cord to a power supply, as in the prior art.

United States Patent Application No. 2009/0243391, published by Susong, III, et al. on Oct. 1, 2009, describes a power supply designed to provide power to networking utilities such as routers and switches. The power supply accepts alternating current, converts it to direct current, and powers at least one PoE port. The power source also includes an internal battery backup, and redundancies to make sure the power remains continuous. In order to provide continuous power, the device includes a failover communication interface between the main power supply and a backup source operating in an off-line mode. The failover interface detects when the main power source has been interrupted, at which time the backup source becomes the on-line source to provide power to the device.

U.S. Pat. No. 7,286,556, issued to Jackson on Oct. 23, 2007, discloses a system and method for delivering power to a number of devices attached to a central networking device. The central networking device delivers power over an Ethernet network, and can provide backup power to those devices on the network that would normally not warrant multiple redundant power sources. The system discloses delivery of power over a cable with different wires for data and power, or over the same cable using different frequencies and filters to maintain the integrity of the signals.

The prior art systems for providing UPS for a PoE device fail to address the separation between the power source equipment and PoE devices and the further complication of the lack of an AC power supply, when the PoE devices are in remote locations. For example, remote network webcams connect by Ethernet cables for the power and data transmission to a control center. The remote network webcams can be located away from the regular power grid and standard AC power may not be available. The control center can also be located miles away and monitor multiple network webcams in other locations far and near. The prior art systems provide UPS for the control center as the power source equipment for the remote network webcams. The advanced prior art systems relate to prioritizing which PoE devices continue to receive power during an outage at the control center as the power source equipment. There is no disclosure of any power supply issue at the location of the PoE device or power supply issues, when there is no AC power supply at remote locations. Local power management and local power management from a DC power source at a remote location are unnecessary redundancies of the control center management of the prior art.

However, not all remote network webcams can use the control center as power source equipment. Over long distances, the voltage necessary to transfer power and data from the control center to each remote network webcam is too high for Ethernet cables. The capacity of the Ethernet cable is insufficient to power remote PoE devices in many instances. Voltage drops or current fluctuations are created by resistance build-ups over lengthy power runs through Ethernet cables. Traditional PoE injectors overcome the long distance and Ethernet cable capacity issues. The PoE injector connects local AC power to the PoE device, concurrent with the data transmission between the control center and the PoE device. The prior art UPS systems for PoE devices do not address the injector-based systems for extensive and wide networks. Power disruptions at the local level of the injector and PoE device continue to affect systems with widespread PoE devices. A localized power outage can still disrupt PoE devices within an overall network, even as UPS prior art protects the control center. Prior art UPS systems have not yet addressed the expansion of PoE devices in wide and remote networks.

Additionally, prior art PoE devices rely on passive injectors. The amount of power received from the PoE device is the amount of power received as a pass-through the available cables. There is no active management of the amount of power in order to support the powered device. The system is limited to the length of cable between the power source equipment and the powered device because the amount of power passed through controlled the power available to the powered device. The systems with old cables and old power source equipment having previous PoE standards (such as IEEE 802.3af) would never be able to pass through sufficient power for the powered devices that require the updated PoE standards, such as IEEE 802.3at. The account for technology upgrades to the physical constraints of the equipment, there is a need for a system to actively set the threshold for the powered device output.

Further mechanical limitations include the length of cable. The range of the network cannot be extended due to the inherent limitation of 100 m per segment of CAT-5 based Ethernet cables. There is a need to extend the range, while maintaining the 10/100/1000 base-T functionality. The powered device must maintain connections from the control center of the network to the remote location of the system and from the location of the system to the powered device.

The adjustment and extension of distance between the powered device and the power source equipment with the PoE injector still does not address direct current power. The prior art PoE injectors rely on accessible AC power sources for the extension. When there is no AC power in very remote locations, there must be another modification. Extending distance from the power source equipment to the powered PoE device has previously been disclosed for AC power. There is a need to consider DC power at the powered PoE device and how that limitation affects the other components of UPS for the PoE devices.

It is an object of the present invention to provide embodiments of a system and method for supplying uninterruptible power to a PoE device.

It is an object of the present invention to provide embodiments of a system and method for managing power from a power supply input from a DC power supply at a remote location in a powered state.

It is another object of the present invention to provide embodiments of a system and method for regulating available power to the powered devices and the alternative power supply based on a DC power supply input.

It is another object of the present invention to provide embodiments of a system and method for regulating available power to the powered devices and to charge the batteries of the alternative power supply based on a DC power supply input.

It is still another object of the present invention to provide embodiments of a system and method for supplying uninterruptible power for more than one powered device.

These and other objectives and advantages of the present invention will become apparent from a reading of the attached specifications and appended claims.

BRIEF SUMMARY OF THE INVENTION

Embodiments of the present invention include a system for supplying uninterruptible power for a Power over Ethernet (PoE) device. In embodiments of the present invention, the system includes a housing, a power supply input on the housing for a DC power source, a power source equipment input on the housing, a powered device output on the housing, an alternative power supply within the housing, and a control module within the housing. The control module includes a battery charger. When the alternative power supply is a plurality of battery packs, the battery charger supplies power to charge the battery packs in sequence in the powered state. The battery packs can be charged with the availability of the onsite power in addition to any power from the power source equipment.

Embodiments of the present invention also include the system having a housing, a power supply input on the housing for a DC power source, a power source equipment input on the housing as an SPF module for different types of network connections, a powered device output on the housing, an alternative power supply within the housing, and a control module within the housing. In this embodiment, the system still supplies uninterrupted power to at least one powered device, even when a problem occurs with the DC power source.

DETAILED DESCRIPTION OF THE INVENTION

Referring to FIGS. 1-6, embodiments of the system 10 for supplying uninterruptible power are shown. The system 10 includes a housing 12, a power supply input 14, a power source equipment input 16, a first powered device output 18, a second powered device output 18', an alternative power supply 20, and a control module 22. FIGS. 1-4 show the housing 12 as a separate unit for placement at a location of the powered device or PoE device. The PoE device is remotely located from a control center of the overall network of PoE devices, and the power source for the control center is separate from each PoE device. The system 10 is remotely located itself, such that an abundant AC power source is not available. The power supply input 14 relies on DC power, such as a generator, battery, or solar cell.

The PoE device still relies on the data transmission back and forth through the network from the control center as the power source equipment 44. The only power from the control center or from intervening power source equipment is transmitted by Ethernet cabling to the PoE device. Because of the physical restraints of Ethernet cabling, not much power is transmitted to the system 10. The Ethernet cabling engages the power source equipment input 16, supplying primarily data and some power. The power source equipment input 16 depends on the module, such as CAT5/6, fiber, coaxial or other network cable. The power source equipment 44 includes an SFP module 44' and a processor 44" that connects the data and some power to the system 10. The processor 44" can be comprised of a storage management processor and a Data and Power over Ethernet processor. The bifurcation of the processor 44" allows non-ethernet interfaces, such as battery management, to be separated from the higher level data and PoE power on the network. In the prior art systems, there is only one processor for SFP module 44' and the Ethernet switch 49, and this one processor also controls the battery management system with connections to the main battery charger 43 and the auxiliary battery chargers 43'. At this level the control of the Ethernet switch 49 is a relatively simple on and off for network connectivity. The processor 44' is only connected to the Ethernet switch 49 for the battery management system. However, the network connectivity is no longer so simple to manage. There are levels of routing control, security, and data connectivity that is sometimes more important than the power! In modern systems, the data is more important than the power, so a full processor is needed, instead of only an Ethernet switch 49. In the present invention, this bifurcation is disclosed with a separation of duties and connections for the Data and PoE Processor to connect to the PoE Power Management 47 and the Ethernet switch 49 and the Storage Management Processor for the battery management system. The network related functions of the PoE Power Management 47 are still incorporated into the power source equipment 44, but at a level separate from the battery management system of the storage management processor. In the present invention, the power source equipment 44 still manages the data and power from the network connection into the system 10. There may be some power transmitted from the power source equipment 44 through the power source equipment input 16, but that power is not generally sufficient to run the PoE device. As such, the intervening power source equipment can be a router or network switch or Ethernet switch 49. Additionally, the data and connectivity is also managed through connections between the Ethernet switch 49 and the PoE Power Management 47. The PoE device is required to source power from a more local source, while still transmitting and using data and the bit of power from the power source equipment input 16. Ethernet cabling originating from the control center can connect to the power source equipment input 16, which connects the system 10 into the overall network of data.

Figure 6:
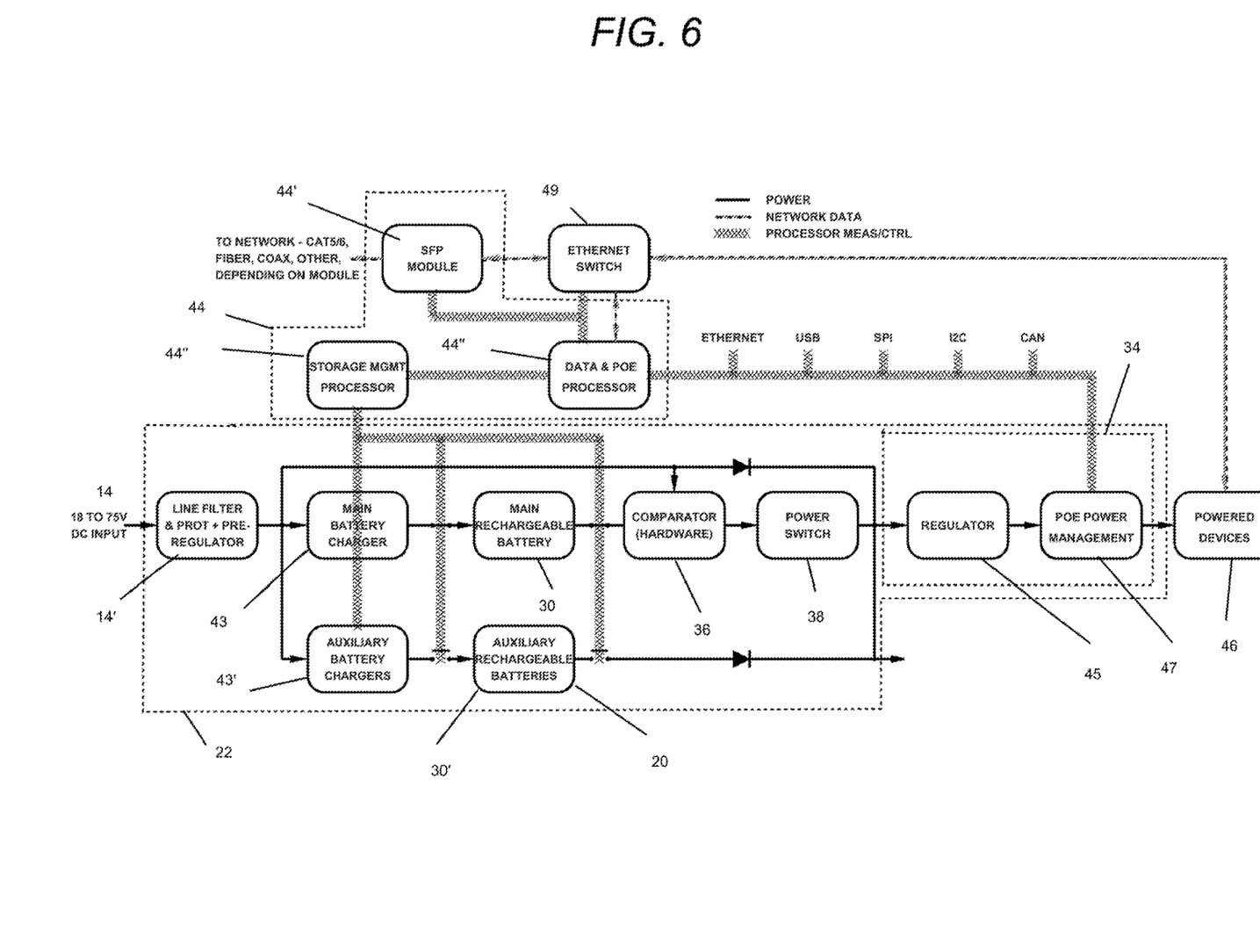
FIG. 6 is a schematic illustration of an embodiment of the system and method for supplying uninterruptible power to a PoE device, according to the present invention.

FIGS. 1-4 show the power supply input 14 for DC input of the present invention, which actually supplies the power for the system 10 and the powered device output 18 for the PoE device. In the past embodiments of the present invention, a wall outlet near the powered device could plug into the housing at the power supply input. FIG. 6 now shows that the power supply input 14 is DC input ranging from 18 to 75V. The DC input may be another local power source, such as batteries, a generator, or even a solar panel/solar cell. The present invention accounts for the remote location of the system 10, when conventional AC power sources, like wall sockets, are not available. In the present invention, the DC input as power source connected to the power supply input 14 is still local and must be separate from the power source for the power source equipment 44 as the control center through the overall network cable. The system 10 operates as a part of an overall system. The collection and transmission of data at remote locations, like at the system 10, are incorporated into the overall network. Power disruptions in one location will not crash the entire network. The system 10 of the present invention adds an uninterruptible power supply (UPS) to PoE devices. Previous networks only have the UPS at the control center to preserve data and avoid disruption. The system 10 of the present invention is compatible with DC input that allows separate UPS at the remote location of the PoE device.

Figure 1:
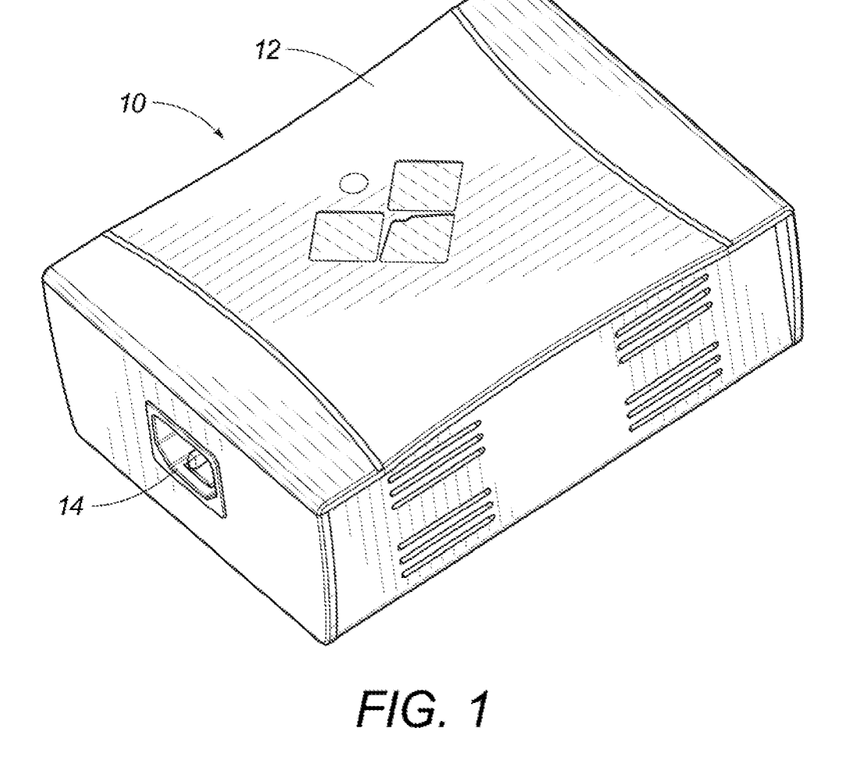
FIG. 1 is an upper perspective view of an embodiment of the system for supplying uninterruptible power, according to the present invention.
Figure 2:
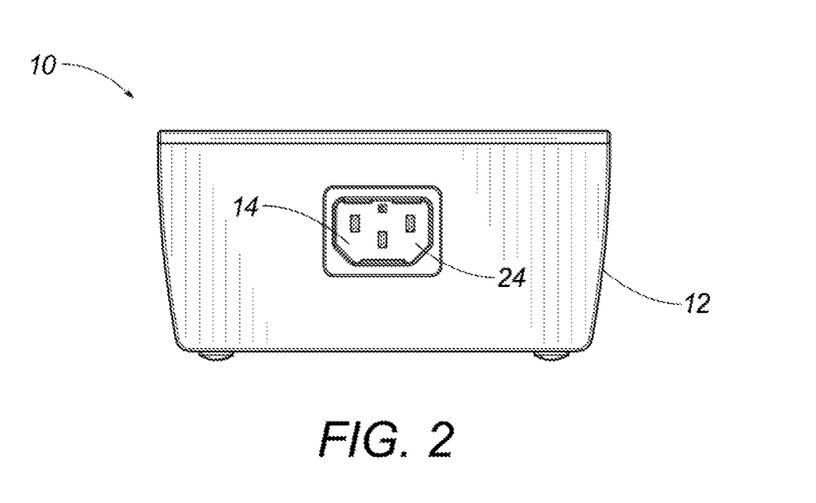
FIG. 2 is an end view of the embodiment of FIG. 1.

On the housing 12, the power supply input 14 is disposed with a Power Supply (PS) interface 24, as shown in FIGS. 1 and 2. The interface 24 is on an outside surface of the housing 12. The interface 24 is compatible as a connection for an SFP module 44', according to the type of network cable as CAT5, CAT6, fiber, coaxial or other. The SFP module 44' connects to an DC power source, such as a battery, generator, or solar panel or solar cell. The DC power source can be as remote as the powered device, while maintaining the data (and some power) of the power source equipment 44 within the network.

Figure 3:
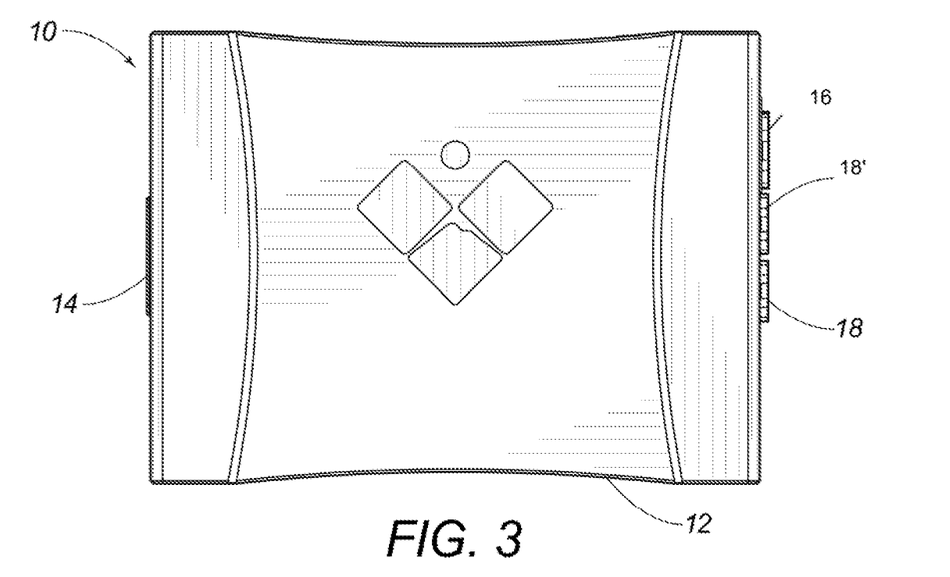
FIG. 3 is a top plan view of the embodiment of FIG. 1.
Figure 4:
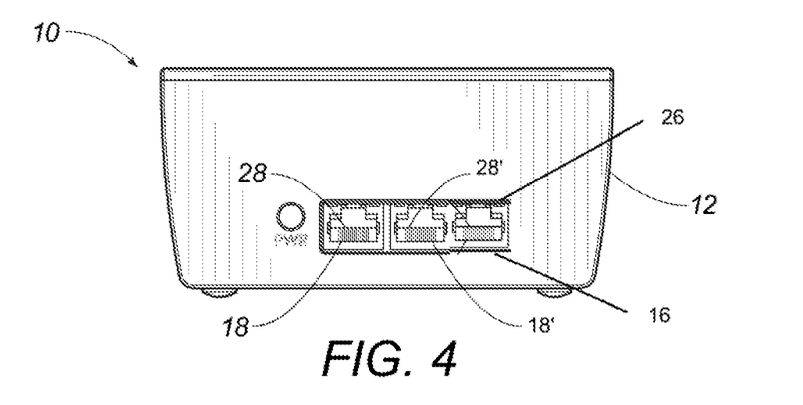
FIG. 4 is an opposite end view of the embodiment of FIG. 1.

FIGS. 3 and 4 show the power source equipment input 16, and the first and second powered device outputs 18, 18' disposed on the housing 12. The power source equipment input 16 has a power source equipment (PSE) interface 26. The first powered device output 18 has a first powered device interface 28, and the second powered device output 18' has a second powered device interface 28'. In embodiments of present invention, the PSE interface 26 and the PD interfaces 28, 28' are Ethernet ports on the outside of the housing 12. Ethernet cables, such as CAT5, CAT6, fiber, coaxial or other, for power and data connect devices to the housing 12 through these interfaces 26, 28 and 28'. Other embodiments include auxiliary power supply cable ports for either of the PSE interface 26 or PD interfaces 28, 28'. In the embodiments of FIGS. 1-5, the power source equipment input 16 connects power source equipment 44 of the overall network. The power source equipment may include a PoE network switch, a non-PoE network switch, a computer network, and other power and data sources. The power source equipment is part of a data and power network. The power source equipment is not powered by the same power source as the system 10.

Also in the present invention, the first powered device output 18 connects a powered device 46 to the system 10. The powered device becomes part of the overall network as well, with transmission of data and power to other power source equipment, such as a control center computer. In the embodiments of FIGS. 1-5, the powered device is a PoE device, such as a wireless router, a network webcam, a voice over Internet Protocol (VoIP) telephone, a wireless access point, a camera, and a data processor. FIG. 6 shows a schematic illustration of the powered device 46. Additional powered devices can be added as indicated by PD interfaces 28, 28' for more than one powered device. FIG. 6 also illustrates the power source equipment 44. The power source equipment 44 includes an SFP module 44' and a processor 44", compatible with a network and a network cable with at least one network input and network output so as to provide data and power to the power source equipment input 16. In some embodiments, the processor 44" is comprised of a storage management processor 44" connected to the main battery charger 43 and auxiliary battery charger 43' and a Data and PoE power processor 44" connected to the Ethernet switch 49 and the PoE Power Management 47. The network cable is an Ethernet cable, such as CAT5, CAT6, fiber, coaxial or other, for power and data transmission back and forth. In some embodiments, the network output has cable supply terminals, such as two 22-28 AWG conductor output supply terminals. The network cable transmits and receives data through the power source equipment input 16 to the control module 22 and to the powered device 46.

Figure 5:
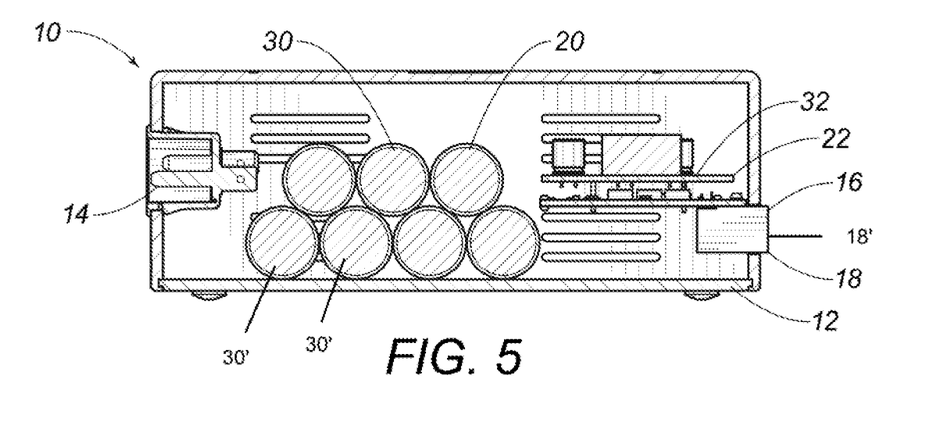
FIG. 5 is a cross-sectional view of an embodiment of the system for supplying uninterruptible power, according to the present invention.

FIG. 5 shows the embodiments of the alternative power supply 20 disposed within the housing 12. The alternative power supply 20 stores energy for use by the powered device. In some embodiments, the alternative power supply 20 is a battery 30 or plurality of battery packs 30', as illustrated in different ways in FIGS. 5 and 6. The battery packs 30' are connected in series, and each battery pack 30' is charged in order. The control module 22 can detect charge status of each battery pack 30' so that each battery pack 30' can be maintained. In some embodiments, the alternative power supply 20 is a lithium ion battery. In the system 10, the alternative power supply 20 stores power from the power supply input 14 from DC input or the power source equipment input 16, so that the alternative power supply 20 is ready to supply power, when there is a disruption of the power supply input 14 as DC input. Thus, the alternative power supply 20 can also be a chemically activated recharging supply, so that the alternative power supply 20 actively stores power supplied by the system 10. For example, the alternative power supply can store the power from the power source equipment input 16 by Ethernet cable and/or from the power supply input 14 by a battery or solar panel.

The control module 22 of the embodiments of the present invention is shown in FIG. 5 as disposed within the housing 12. The control module 22 connects the power supply input 14 through a line filter and protection 14', the power source equipment input 16, the first powered device output 18, the second powered device output 18', and the alternative power supply 20 into the system 10. The control module 22 manages the power and data received by the system 10 within the housing 12 and distributes data and power to through the powered device outputs 18, 18' to the powered device or PoE device. The regulation of the power within the system 10 insures UPS to the powered devices 46, 46'. There is direct connection of the system 10 between the power source equipment and the powered devices, instead of direction connection of the power source equipment to the powered devices. The buffering like activity of the control module 22 preserves the powered device on the overall network and simultaneously allows for the local connection of the power source to the powered device. UPS for a PoE device is possible with the intervention of the system 10 of the present invention. The particular power regulation by the system 10 is beyond the prior art.

Embodiments of the system 10 in FIG. 6 include the control module 22 being comprised of a line filter and protection 14', an injector means 34, a comparator means 36 (hardware), and a switch means or power switch 38 on a printed circuit board (PCB) 32. The PCB 32 is disposed within the housing 12. The line filter and protection 14' replaces the conventional converter means for AC power. The line filter and protection 14' collects and distributes DC power to the battery charger 43 in a safe manner from DC power source of the power supply input 14. The injector means 34 controls the DC power to the powered device 46 through the powered device outputs 18, 18'. Data and power are managed by the injector means 34 from the power source equipment input 16, the power supply input 14, and the alternative power supply 20 to the powered device outputs 18, 18'. The comparator means 36 is hardware that detects power from the power supply input 14 and power to the powered device outputs 18, 18'. The comparator means 36 connects the power source equipment input 16 and the power supply input 14 to the switch means or power switch 38. The comparator monitors the amounts of power incoming for the powered device 46, whether the power comes from the power supply input 14 or the power source equipment input 16. For UPS, the power to the powered device outputs 18, 18' must be maintained for operation of the powered device 46 without regard to the source, so that disrupted sources do not disrupt the powered device. In the present invention, the power supply input 14 connects to a DC power supply separate from the power supply of the power source equipment. The present invention has the flexibility to have DC power at the system 10 and AC power at the power source equipment 44. The switch means 38 can be a power switch and selects incoming power from either the power supply input 14 as determined by the comparator means 36 or the alternative power supply 20 or the power source equipment input 16 as determined by the comparator means 36 or any combination thereof to the injector means 34 for distribution. The switch means 38 enables UPS so that power through the powered device outputs 18, 18' is stable for the powered device.

The control module 22 also includes the line filter and protection 14', instead of a converter, between the injector means 34 and the power supply input 14. When the power source supplies DC power to the power supply input 14, the line filter and protection 14' provides safe and compatible DC power to the powered device 46, and the DC power can be distributed from the injector means 34 to the powered device outputs 18, 18'. The control module 22 regulates the power supplied and the power distributed. The proper type of power is supplied through the powered device outputs 18, 18' according to the injector means 34.

Embodiments of the present invention include an active injector means 34 being comprised of a regulator 45 and a power autonegotiation module or PoE Power Management module 47 in communication with the regulator 45. The regulator 45 connects the switch means 38 to the power autonegotiation module 47, and the power autonegotiation module 47 connects the regulator 45 to the powered device output 18. Previous embodiments have been classified as "passive injectors" with the power source equipment input determining the amount of power. The system 10 was a pass through for the available PoE power to the powered device 46. In the present invention, auto-negotiation is performed so that the current PoE standard (IEEE 802.3at) can be made compatible with the previous PoE standard IEEE 802.3af. Older equipment and existing cabling can now accommodate the updated and more current PoE powered devices at the remote locations, including locations with only DC power by batteries or generators or solar panels. The PoE Power Management module or power autonegotiation module 47 can set a threshold for the powered device regardless of whether the originating PSE complies with the current standard and upgrades. No matter which type of power source equipment is used, the system 10 will appropriately power the powered device 46 to the required IEEE standards. The active injector means 34 connects the power source equipment input 16 to the powered device 46 so as to distribute data between the power source equipment and the powered device. Additionally, the power autonegotiation module or PoE Power Management module 47 determines a predetermined amount of power for the powered device outputs 18, 18' according to the powered device 46. The powered device 46 may have different power requirements than the power source equipment connected to the power source equipment input 16. The regulator 45 activates the switch means 38 for the power sources providing the corresponding voltage to the powered device output 18 according to the predetermined amount of power.

According to the monitoring of the comparator means 36, the switch means 38 makes a particular connection between either the power supply input 14, power source equipment input 16, or the alternative power supply 20 according to the regulator 45 commands to the switch means 38. The commands are set by the PoE Power Management module or power autonegotiation module 47 of the injector means 34. Whatever amount of PoE power through the power source equipment input 16, along with the data from the power source equipment, embodiments of the present invention no longer rely on this pass through PoE power for the powered device outputs 18, 18'. The pass through PoE power from the power source equipment input 16 is actively managed by the power autonegotiation module 47 to power the powered devices 46, 46' to contribute power to the powered device or to charge the alternative power supply 20.

The system 10 is usually located so far away from the power source equipment that the Ethernet cables are very long. The distance of the Ethernet cabling diminishes the amount of pass through PoE power able to be harnessed at the power source equipment input 16 by the system 10. Embodiments of the present invention can include an auxiliary power supply (not shown) connected to the regulator 45 of the injector means 34. This auxiliary power supply may be a local outlet, similar to the power supply connected to the power supply input 14 or another PoE power source by another power source equipment. The auxiliary power supply presents yet another power source for active management by the power autonegotiation module 47 and regulator 45 of the injector means 34.

FIG. 6 also shows the alternative power supply 20 as auxiliary rechargeable batteries. The alternative power supply 20 can be a rechargeable battery or other chemically activated recharging power source. The embodiment of FIG. 6 shows the control module 22 having a batter recharger 43 connected to the line filter and protection 14' for DC power and the alternative power supply 20. The battery charger 43 transfers power from at least the power supply input 14 and stores power in the alternative power supply 20. FIG. 6 also shows a rechargeable battery main 30 in parallel with the battery packs 30' as the alternative power supply 20. The UPS of the system 10 includes multiple batteries 30, 30' and possibly the DC power source connected to the power supply input 14. The redundancy is not disclosed by the prior art, and this hierarchy of managing power between rechargeable batteries 30, 30' and possibly the DC power source allows for remote location of powered device 46 with the reliability of UPS and data flow. As another power source, the alternative power supply 20 is no longer limited to pass through PoE power. The power autonegotiation module 47 may demand more power from the alternative power supply 20 than provided and stored from the power source equipment input 16. In the present invention, the alternative power supply 20 can contribute to the threshold PoE power now required by an upgraded powered device 46, regardless of the pass through PoE power from the power source equipment input 16. FIG. 6 also shows the processor 44" being comprised of a storage management processor 44" connected to the main battery charger 43 and auxiliary battery charger 43' and a Data and PoE power processor 44" connected to the Ethernet switch 49 and the PoE Power Management 47. The wireless and connectivity functions are managed together at the Data and PoE power processor 44", and there is separation from the non-ethernet interfaces for the battery storage management of the storage management processor 44". Even though PoE Power Management 47 is power management, the PoE Power Management 47 is connected to the Data and PoE processor 44". The PoE power out to the powered devices 46 are connected in line with the data connectivity, not the battery storage management. The present invention splits connections for power management, even though prior art system usually maintain the same connections. In one example of a parking lot with timed street lights as powered devices 46, it can be normal to have AC power for only 8 hours a day, corresponding to the hours of darkness and the need for lights. The system 10 is expected to be able to run on battery power for the remaining 16 hours. In order to charge batteries 30, 30' of this capacity in this shorter time period, much higher charging rates are required. Whereas it was previously sufficient to charge batteries 30, 30' sequentially, the main rechargeable battery 30 and the auxiliary rechargeable batteries 30' must now be charged simultaneously in order to stay within the manufacturers' maximum charge rates and preserve the lifetime longevity of the battery packs. The batteries 30, 30' may be assembled in a modular charger "brick" with its own microprocessor. Many bricks can be controlled in symbiosis with each other, or they will also be able to operate autonomously by themselves. The processor 44" on the main board will manage both the output power of the main board, and the input power, be it DC, Solar or (eventually) AC, to optimize performance and efficiency.

The remaining limitation of the power source equipment has been the physical constraints of the existing Ethernet cables. The network cannot be extended due to the inherent limitation of 100 m per segment for CAT-5 based Ethernet cabling or other network cabling. In the present invention, a power source equipment extension or Ethernet switch 49 is added between the powered device 46 and the power source equipment 44 connected to the power source equipment input 16. The power source equipment extension 49 can be an Ethernet switch, which adds an additional 100 m to the maximum achievable length of the CAT-5 cable, while maintaining 10/100/1000 base-T functionality. The additional Ethernet switch can pass the PoE managed by the control module 22 to a powered device 46 further from the system 10. The power source equipment extension 49, as another power source equipment, can relay the threshold PoE power further to the powered device 46. Other embodiments include the system 10 being compatible Ethernet cabling with PoE over four CAT-5 pairs instead of two CAT-5 pairs. The capacity increases power up to 60W to be supplied. Although projected capacity has ranged between 12VDC-24VDC, the system 10 can also handle greater than 24VDC, including up to 60W for modified Ethernet cabling. The fast upgrades to the physical components are good, but existing infrastructure and existing PoE devices cannot be so completely and comprehensively replaced with each upgrade. The injector means 34 of the present invention now accounts for retro-fit networks and future physical upgrades. The present invention combines the extension of data and power by the Ethernet switch 49 and the DC power source for the power supply input 14 in order to enable the remote location of powered device 46 off the conventional power grid.

Embodiments of the present invention include the method of supplying uninterruptible power to the powered device with the system 10 in the powered state. The powered state refers to the power supply 14 providing the power from a DC supply, such as the system being connected to a solar cell in a remote location. The power autonegotiation module 47 of the injector means 34 sets a predetermined amount of voltage to the first powered device output 18 and the second powered device output 18'. The predetermined amount of voltage corresponds to the powered devices 46. The powered devices 46 may require more power than available through the power source equipment connected to the power source equipment input 16, especially with more than one powered device. Next, the power supply input 14 supplies power to the powered devices 46 through the regulator 45 of the injector means 34. In this powered state, the power supply input 14 also supplies power to the alternative power supply 20 through the battery charger 43. When the alternative power supply 20 is comprised of a battery 30 or a plurality of battery packs 30', each battery pack 30' is charged in a pre-determined sequence. A main battery pack 30 can always be charged first and maintained first. The control module 22 can detect a charge status of each battery pack 30' so that each battery pack 30' can be maintained in order. The power management controls so that battery packs 30' are charged in the powered state.

When power autonegotiation module 47 detects insufficient power at the injector means 34, the regulator 45 activates to collect power for the powered device output 18 from the power supply input 14 and at least one power source. The charging of the alternative power supply 20 is stopped because the powered device or devices take priority. The regulator 45 commands the switch means to connect to at least one power source that is available, including the alternative power supply 20, the line filter and protection 14', and the power source equipment input 16 through the comparator means 36. After activating the regulator, the injector means 34 monitors voltage at the power supply input 14. When sufficient power from the power supply input is detected, the injector means 34 switches power to the powered device output from the at least one power source to the power supply input 14. The brownout of the power supply input 14 no longer disrupts the powered device 46, even at the remote location and network connection. The instantaneous switch and use of PoE power to manage the powered device enables remote cameras and devices to continue to function through local power outages.

The method includes supplying power to the alternative power supply 20 from the power source equipment input 16, which is recharging the battery with PoE, when that PoE is not being used to power the powered device 46. The battery charger 43 can be used between the power supply input 14 and the alternative power supply 20 for recharging the alternative power supply 20.

Embodiments of the present invention include the method of supplying uninterruptible power to the powered device with the system 10 in the powered state with more than one powered device. In this method, the power supply input 14 supplies power to the first and second powered device outputs 18, 18' and charges the alternative power supply 20. When power autonegotiation module or PoE Power Management module 47 detects insufficient power at the injector means 34, the regulator 45 activates to collect power for the first powered device output 18 and the second powered device output 18' from the power supply input 14 and at least one power source. The charging of the alternative power supply 20 is stopped because the powered device or devices take priority. Each battery pack 30' will remain at the current charge status or lower as any power is supplied from the battery packs 30'. The regulator 45 commands the switch means to connect to at least one power source that is available, including the alternative power supply 20, the line filter and protection 14', and the power source equipment input 16 through the comparator means 36. After activating the regulator, the injector means 34 monitors voltage at the power supply input 14. When sufficient power from the power supply input is detected, the injector means 34 switches power to the powered device output from the at least one power source to the power supply input 14. The brownout of the power supply input 14 no longer disrupts the powered device 46, even at the remote location and network connection. The instantaneous switch and use of PoE power to manage the powered device enables remote cameras and devices to continue to function through local power outages.

The present invention provides a system and method for supplying uninterruptible power to a PoE device. The system and method for managing power from a power supply input from a DC power supply allows for the extended range of PoE devices in remote locations. The extension of data and power by power source equipment extensions increased the distance from control centers to the powered devices. The availability of AC power was a limitation that restricted powered devices to developed areas. The present invention incorporates DC power at the power supply input, including generators, batteries, and solar panels/solar cells. The DC power is not tied to the AC power grid, so these DC power sources can be placed in more remote and isolated areas. The combination of the extension of the data and power improved range for PoE, and the embodiments with DC power further improve the range for PoE. The system can still power devices and charge the batteries with UPS, including some embodiments with a redundancy and hierarchy of batteries. DC power sources without batteries, such as generators, can also improve the range of powered devices. Additionally, these adjustments remain compatible with supplying uninterruptible power for more than one powered device.

The foregoing disclosure and description of the invention is illustrative and explanatory thereof. Various changes in the details of the illustrated structures, construction and method can be made without departing from the true spirit of the invention.

We claim:

1. A system for supplying uninterruptible power, comprising:
   a housing;
   a power supply input disposed within said housing, said power supply input having a power source interface on an outside of said housing;
   a power source equipment input disposed within said housing, said power source equipment input having a power source equipment interface on an outside of said housing;
   a powered device output disposed within said housing, said powered device output having a powered device interface on an outside of said housing;
   an alternative power supply disposed within said housing;
   a powered device connected to said powered device output by an Ethernet cable;
   power source equipment connected to said power source equipment input, said power source equipment being powered separate from said power supply input and said alternative power supply;
   a control module connected to said power supply input, said power source equipment input, said powered device output, and said alternative power supply; and
   a power source equipment extension between said powered device output and said powered device an intervening power source equipment,
   wherein said control module comprises an injector means, a comparator means, a switch means, and a line filter and protection means,
   said comparator means detecting power from said power supply input and to said powered device output and connecting said power source equipment input and said power supply input to said switch means,
   said line filter and protection means providing DC power from said power supply input and connecting said power supply input to said comparator means, said injector means, and said alternative power supply,
   said switch means connecting said comparator means and said alternative power supply to said injector means,
   said injector means collecting and distributing power, said injector means being comprised of a regulator and PoE power management module, said regulator connecting said switch means to said PoE power management module, said PoE power management module connecting said regulator to said powered device output, and
   wherein said control module further comprises a battery charger, said battery charger storing power from at least one of said power supply input and said power source equipment input, said battery charger distributing power to said alternative power supply.

2. The system for supplying uninterruptible power, according to claim 1, said alternative power supply being comprised of a chemically activated recharging power source.

3. The system for supplying uninterruptible power, according to claim 1, said alternative power supply being comprised of a plurality of battery packs, each battery pack being connected in series.

4. The system for supplying uninterruptible power, according to claim 1, wherein said injector means connects said power source equipment input to said powered device so as to distribute data and power between said power source equipment and said powered device, said PoE power management module determining a predetermined amount of power for said powered device output, said regulator activating said switch means, said switch means providing voltage to said powered device output according to said predetermined amount of power.

5. The system for supplying uninterruptible power, according to claim 1, wherein said power source equipment extension is an Ethernet switch.

6. A method of supplying uninterruptible power, said method comprising:
   providing a system according to claim 1;
   setting a predetermined amount of voltage to said powered device output with said PoE power management module;
   supplying power from said power supply input to said powered device through said regulator of said injector means;
   supplying power from said power supply input to said alternative power supply through said battery charger;
   charging said alternative power supply;
   detecting insufficient power at said injector means by said PoE power management module;
   activating said regulator to collect power for said powered device output from said power supply input and at least one power source selected from a group consisting of said alternative power supply, said power supply input, and said power source equipment input through said comparator means;
   monitoring voltage at said power supply input after the step of activating said regulator;
   detecting sufficient power from said power supply input with said regulator; and
   switching power to said powered device output from said at least one power source.

7. The method for supply uninterruptible power, according to claim 6, further comprising the step of:
   supplying power from said power source equipment input to said alternative power supply through said switch means.

8. The method for supply uninterruptible power, according to claim 6, wherein said alternative power supply comprises a plurality of battery packs, each battery pack being connected in series, and
   wherein the step of supplying power from said power source equipment input to said alternative power supply through said switch means further comprises the steps of:
      charging each battery pack in a pre-determined sequence;
      detecting a charge status of each battery pack; and
      maintaining each battery pack, during the step of supplying power from said power supply input to said powered device through said regulator of said injector means.

9. A system for supplying uninterruptible power, comprising:
- a housing;
- a power supply input disposed within said housing, said power supply input having a power source interface on an outside of said housing;
- a power source equipment input disposed within said housing, said power source equipment input having a power source equipment interface on an outside of said housing;
- a powered device output disposed within said housing, said powered device output having a powered device interface on an outside of said housing;
- an alternative power supply disposed within said housing;
- a powered device connected to said powered device output by an Ethernet cable;
- power source equipment connected to said power source equipment input, said power source equipment being powered separate from said power supply input and said alternative power supply;
- a control module connected to said power supply input, said power source equipment input, said powered device output, and said alternative power supply; and
- a power source equipment extension between said powered device output and said powered device an intervening power source equipment,
- wherein said control module comprises an injector means, a comparator means, a switch means, and a line filter and protection means,
- said comparator means detecting power from said power supply input and to said powered device output and connecting said power source equipment input and said power supply input to said switch means,
- said line filter and protection means providing DC power from said power supply input and connecting said power supply input to said comparator means, said injector means, and said alternative power supply,
- said switch means connecting said comparator means and said alternative power supply to said injector means,
- said injector means collecting and distributing power, said injector means being comprised of a regulator and PoE power management module, said regulator connecting said switch means to said PoE power management module, said PoE power management module connecting said regulator to said powered device output,
- wherein said control module further comprises a battery charger, said battery charger storing power from at least one of said power supply input and said power source equipment input, said battery charger distributing power to said alternative power supply, and
- wherein said power source equipment is comprised of a small form-factor pluggable transceiver module and a processor, said processor being comprised of a storage management processor connected to said battery charger and an auxiliary battery charger and a data and PoE power processor connected to an Ethernet switch and said PoE power management module.

\* \* \* \* \*